(12) United States Patent
Welter et al.

(10) Patent No.: US 6,345,710 B1
(45) Date of Patent: Feb. 12, 2002

(54) CLUTCH ENGAGING AND DISENGAGING APPARATUS

(75) Inventors: Roland Welter, Bühl; Peter Schaaf, Neustadt/Aisch; Gerhard Prosch, Höchstadt; Berthold Schneider, Höchstadt/Aisch, all of (DE)

(73) Assignee: LuK Lamellen und Kupplungsbau GmbH, Buhl/Baden (DE)

( * ) Notice: Subject to any disclaimer, the term of this patent is extended or adjusted under 35 U.S.C. 154(b) by 0 days.

(21) Appl. No.: 09/534,073

(22) Filed: Mar. 24, 2000

Related U.S. Application Data

(63) Continuation of application No. PCT/EP98/05271, filed on Aug. 19, 1998.

(30) Foreign Application Priority Data

Sep. 26, 1997 (DE) ......................................... 197 42 468

(51) Int. Cl.[7] ............................................... F16D 25/08
(52) U.S. Cl. .................. 192/85 CA; 92/128; 192/91 A
(58) Field of Search .......................... 192/91 A, 85 CA; 92/128

(56) References Cited

U.S. PATENT DOCUMENTS

| | | | | |
|---|---|---|---|---|
| 4,773,519 A | * | 9/1988 | Candle et al. ............ 192/91 A |
| 5,307,915 A | * | 5/1994 | Grosspietsch et al. .... 192/91 A |
| 5,632,365 A | | 5/1997 | Maucher ................. 192/70.25 |
| 5,632,706 A | | 5/1997 | Kremmling et al. .......... 477/74 |
| 5,725,456 A | | 3/1998 | Fischer et al. .............. 477/174 |
| 5,743,370 A | * | 4/1998 | Thomire ................ 192/85 CA |
| 5,810,145 A | * | 9/1998 | Thomire ................ 192/85 CA |
| 5,865,288 A | * | 2/1999 | Thomire et al. ........ 192/85 CA |

FOREIGN PATENT DOCUMENTS

| | | | |
|---|---|---|---|
| DE | 41 29 370 A 1 | 3/1993 | ........... F16D/23/14 |
| DE | 43 13 346 A 1 | 10/1994 | ........... B60K/23/02 |
| DE | 296 08 918 U 1 | 9/1996 | ........... F16D/25/08 |
| DE | 195 23 218 A 1 | 1/1997 | ........... F16D/25/08 |
| DE | WO 99/17032 | 4/1999 | ........... F16D/25/08 |
| FR | 2 757590 | 6/1998 | ........... F16D/25/08 |
| GB | 2 259 555 A | 3/1993 | ........... F16D/25/08 |
| WO | WO 96/24781 | 8/1996 | ........... F16D/25/08 |

\* cited by examiner

*Primary Examiner*—Rodney H. Bonck
(74) *Attorney, Agent, or Firm*—Darby & Darby

(57) ABSTRACT

The cylinder of a cylinder and piston unit in the friction clutch engaging/disengaging apparatus of a power train for use in a motor vehicle is assembled of two separately produced coaxial tubular walls. The outer wall is made of a plastic material and is of one piece with an extension serving to supply pressurized hydraulic fluid from a pump or another source to the plenum chamber for the reciprocable annular piston between the two walls. The inner wall is made of sheet metal and one of its end portions is separably coupled to one end portion of the outer wall by snap action. Such one end portion of the outer wall is separably secured to a support, usually the transmission case in the power train of the motor vehicle.

20 Claims, 4 Drawing Sheets

CLUTCH ENGAGING AND DISENGAGING APPARATUS

CROSS-REFERENCE TO PERTINENT CASES

The present application is a continuation of International Application Serial No. PCT/EP98/05271 filed Aug. 19, 1998 which claims priority to German patent application Serial No. 197 42 468.5 filed Sep. 26, 1997. The disclosures of the above-referenced patent applications, as well as that of each U.S. and foreign patent and/or patent application identified in the specification, is intended to be incorporated herein by reference.

BACKGROUND OF THE INVENTION

The invention relates to friction clutches and to assemblies which employ engageable and disengageable friction clutches, and more specifically to improvements in apparatus for operating friction clutches, especially in the power trains of motor vehicles. Such clutches are engaged when the prime mover (such as an internal combustion engine and/or an electric machine) drives or is driven by the wheels of the motor vehicle but are disengaged during shifting of the transmission into a gear ratio or into a different gear ratio.

German patent No. 43 13 346 discloses a so-called central clutch engaging and disengaging apparatus (hereinafter called apparatus or clutch actuating apparatus). The apparatus is a hydralically operated arrangement including a so-called slave cylinder and piston unit which is coaxial with the rotary input element of a change-speed transmission. The unit comprises a cylinder which is separably secured to the case (housing) of the transmission, and an annular piston which is reciprocable at one axial end of an annular plenum chamber bounded from without by the aforementioned cylinder and from within by a tubular sleeve-like guide spacedly surrounding the input element (such as a shaft) of the transmission. An end portion of the sleeve-like guide is provided with an annular reinforcement which is adjacent (a) one end portion of the cylinder and (b) the transmission case when the clutch actuating apparatus is installed in the power train of the motor vehicle. The piston bounds one end of the plenum chamber and is provided with an annular seal slidably engaging the internal surface of the cylinder and the external surface of the sleeve-like guide. That end portion of the piston which is remote from the transmission case carries a bearing serving to disengage the clutch (e.g., by engaging the customary radial prongs of and by thus tilting a diaphragm spring of the clutch) when the plenum chamber receives an adequate supply of pressurized hydraulic fluid so that the piston is moved axially and away from the transmission case through a distance which suffices to disengage the clutch. Pressurized fluid is caused to flow into and from the plenum chamber through a passage provided in a radially projecting extension which is carried by the cylinder. The extension is further provided with an aerating passage which also communicates with the plenum chamber and serves to convey flows of a gaseous fluid, such as air.

The cylinder and the sleeve-like guide of the aforedescribed clutch actuating apparatus are two separately produced parts made of sheet metal and having end portions which are adjacent the transmission case and are permanently and sealingly connected to each other. The cylinder has an opening which receives one end portion of the aforedescribed extension, and such one end portion is soldered to the cylinder.

The extension, the cylinder and the sleeve-like guide are made of steel, i.e., the major part of the apparatus consists of steel, mainly of sheet steel stock. The assembly of the cylinder with the separately produced sleeve-like guide and with the separately produced extension takes up much time and such constituents of the apparatus must be produced and shaped in separate machines or production lines. All this contributes considerably to the cost of the slave cylinder and piston unit and of the entire clutch actuating apparatus as well as to the cost of the power train. Furthermore, the weight of the fully assembled unit including the steel cylinder, the steel guide and the steel extension is quite pronounced. Moreover, the assembled combination of cylinder, guide and extension embodies two potential weakened zones which are prone to leakage, namely one between the interconnected end portions of the cylinder and the guide, and the other between the cylinder and the extension.

Published German patent application A 41 29 370 discloses a modified clutch actuating apparatus wherein the slave cylinder and piston unit employs a one-piece plastic cylinder. The cylinder is preferably made of a thermosetting plastic material (preferably in an injection molding machine) because it is provided with at least one undercut portion and must be capable of yielding in the region of such undercut portion. Furthermore, the plastic cylinder must be provided with a thick wall (as measured radially of the slave cylinder and piston unit) in order to ensure that such cylinder will be capable of predictably withstanding the anticipated radial, axial and/or other stresses. This contributes to the bulk of the slave cylinder and piston unit. Still further, the one-piece thermosetting cylinder exhibits the tendency to undergo highly pronounced thermally induced expansion which affects the quality of the sealing action between such cylinder and the piston of the slave unit; this can be counteracted by resorting to a complex and hence bulky and highly expensive sealing arrangement between the cylinder and the piston.

OBJECTS OF THE INVENTION

An object of the instant invention is to provide a cylinder and piston unit which embodies the advantages but does not exhibit the drawbacks of the aforedescribed cons ventional cylinder and piston units.

Another object of the invention is to provide a cylinder and piston unit which can be utilized with advantage as a central slave cylinder and piston unit in the system for actuating the friction clutch of the power train in a motor vehicle.

A further object of the invention is to provide a compact, relatively inexpensive, deformation-resistant and hence long-lasting cylinder and piston unit for use in a clutch engaging/disengaging apparatus.

An additional object of the invention is to provide a novel and improved method of assembling a cylinder and piston unit for use as a means for actuating a friction clutch in the power train of a motor vehicle.

Still another object of the invention is to provide a power train which embodies at least one cylinder and piston arrangement or unit of the above outlined character.

A further object of the invention is to provide a novel and improved separable coupling between the constituents of a composite cylinder which is or which can be utilized in the above outlined cylinder and piston unit.

Another object of the invention is to provide a novel and improved separable connection between the cylinder of the above outlined cylinder and piston unit and a support therefor, e.g., the housing or case of a change-speed transmission in the power train of a motor vehicle.

An additional object of the invention is to provide a novel and improved connection between the cylinder of the above outlined slave cylinder and piston unit and a master cylinder which controls the operation of the slave cylinder and forms part of the clutch engaging/disengaging apparatus in the power train of a motor vehicle.

SUMMARY OF THE INVENTION

The invention is embodied in a novel and improved combination of parts which can be utilized in a clutch engaging and disengaging apparatus and comprises a hydraulic cylinder and piston unit including a composite cylinder having a tubular synthetic plastic outer wall, a tubular metalic inner wall spacedly surrounded by the outer wall, and means for coupling the inner and outer walls to each other. The combination further comprises a support (such as the housing or case of a change-speed transmission in the power train of a motor vehicle) for at least one of the walls.

The means for coupling the inner and outer walls to each other can comprise a snap fastener. The outer wall preferably comprises a substantially annular first end portion, and the inner wall can comprise a substantially annular second end portion adjacent the first end portion; the snap fastener of such composite cylinder can include means for securing the first and second end portions to each other.

The outer wall is preferably provided with an unfinished internal surface (i.e., the finish of such surface can match the finish when the making of the outer wall, e.g., in an injection molding machine, is completed). The internal surface is spaced apart from the external surface of the inner wall, and the novel combination further comprises an annular piston which is reciprocable along the internal surface of the outer wall and is movable around the inner wall. The piston preferably includes a suitable seal which engages the internal surface of the outer wall.

The outer wall is or can constitute a molding, preferably a molding which is a product of an injection molding technique.

The internal surface of the outer wall can constitute a conical surface having a conicity of at least 0.5°; the advantage of such conical internal surface will be pointed out hereinafter. The orientation of the cylinder is preferably such that the reciprocable piston between the inner and outer walls has a first end remote from and a second end nearer to the support. The first end of the piston serves to reciprocate a clutch release bearing which can engage or release the customary radially inwardly extending fingers or prongs of the clutch spring, such as a diaphragm spring. The conical internal surface of the outer wall tapers (i.e., its diameter diminishes) in a direction toward the support.

The plastic material of the outer wall is preferably a thermosetting plastic, e.g., a material selected from the group consisting of phenolic plastics, amino plastics, epoxy resins and unsaturated polyester resins.

The at least one wall which is connected to the support is or can constitute the outer wall of the cylinder, and the means for securing the outer wall to the support can include external eyelets or grommets provided on that end portion of the outer wall which is adjacent the support and fasteners extending through the eyelets and engaging (particularly penetrating into) the support. Such securing means can further comprise prestressed resilient reinforcing sleeves which are disposed in the eyelets, which surround portions of the respective fasteners and which tend to expand radially outwardly against the internal surfaces of the respective eyelets. If the fasteners are threaded fasteners (such as bolts or screws each having a threaded shank and a head at one end of the shank), one end of each of the resilient sleeves can be provided with a collar located between one side of the respective eyelet and the head of the respective threaded fastener.

The aforementioned means for coupling the inner and outer walls to each other can be designed in such a way that its parts are constituted by one end portion of the outer wall and the adjacent end portion of the inner wall, particularly by those end portions of the two walls which are adjacent the support. The end portion of the inner wall can include at least one annular reinforcing section (e.g., a reinforcing section having a substantially U-shaped cross-sectional outline and being receivable in a complementary recess of the support). The means for coupling can include an undercut substantially annular socket provided in one of the two end portions (e.g., in the end portion of the outer wall), and a substantially annular male connector which is removably received in the socket by snap action and forms part of the other end portion. The end portion which defines the socket can be provided with a substantially annular ramp bounding a portion of the socket and being arranged to guide the male connector into the socket during actual coupling of the two walls to each other.

One end portion of the outer wall can be provided (and is preferably of one piece) with an extension, particularly a radially outwardly projecting extension. The extension has at least one fluid conveying passage which communicates (or can be caused to communicate) with the aforementioned annular plenum chamber between the inner and outer walls. That end of the at least one passage which is remote from the one end portion of the outer wall can be sealed by a plug or other suitable sealing means.

The outer wall can carry a suitable valve which can be utilized to ventilate (when necessary) the plenum chamber. The valve can be carried by the aforementioned extension of the outer wall; such extension can be provided with several passages one of which is controlled by the valve and another of which serves to introduce pressurized hydraulic fluid into and/or to permit evacuation of hydraulic fluid from the chamber.

The novel features which are considered as characteristic of the invention are set forth in particular in the appended claims. The improved combination itself, however, both as to its construction and the modes of assembling the same and of incorporating it in a clutch actuating apparatus, together with numerous important and advantageous features and attributes thereof, will be best understood upon perusal of the following detailed description of certain presently preferred specific embodiments with reference to the accompanying drawings.

DESCRIPTION OF PREFERRED EMBODIMENTS

Figure 1:
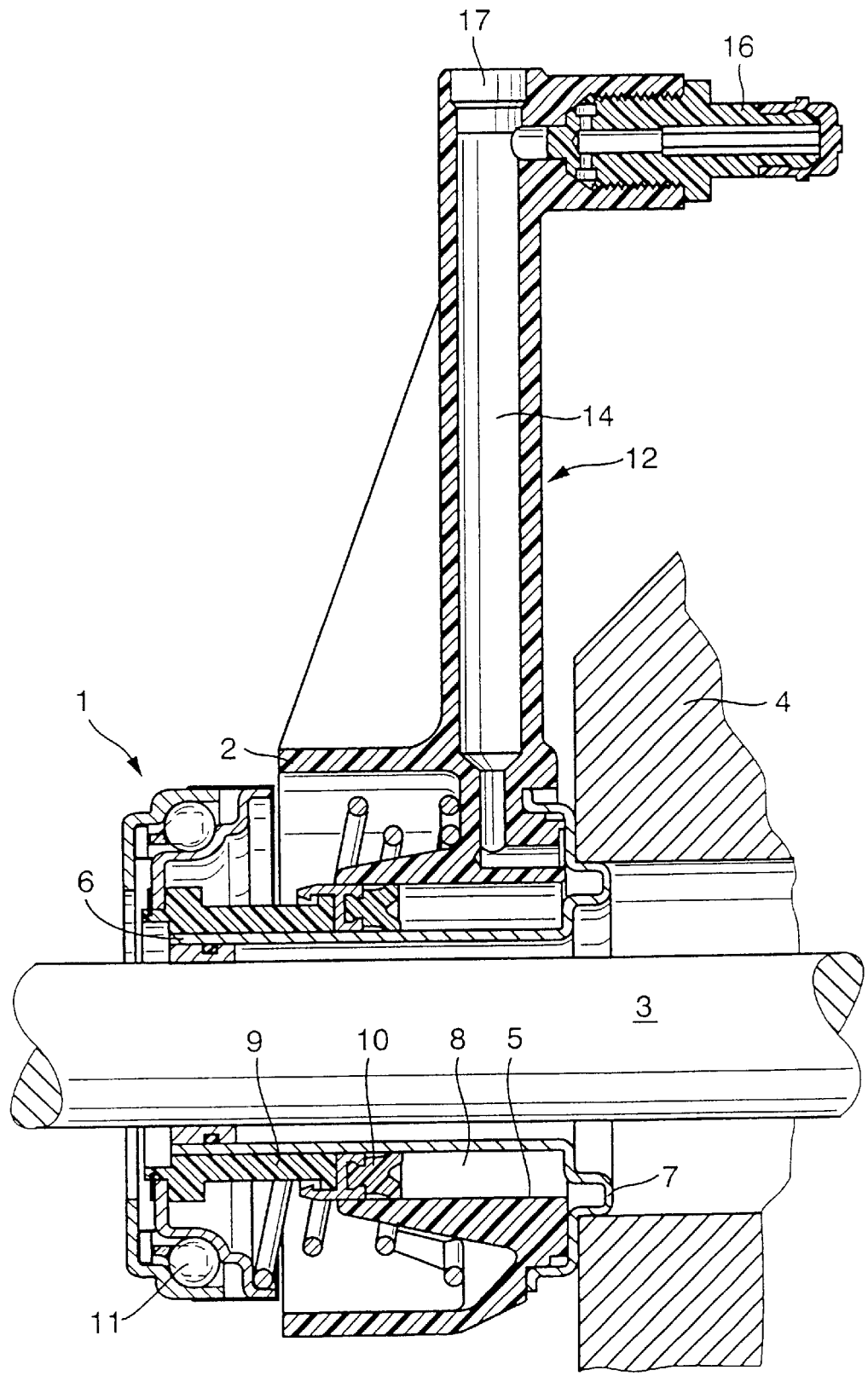
FIG. 1 is an axial sectional view of a portion of a clutch engaging and disengaging apparatus, the composite cylinder and the piston with the release bearing of the illustrated cylinder and piston unit being affixed to the case of a transmission in the power train of a motor vehicle.

FIG. 1 shows a portion of a hydraulically operated apparatus 1 which is designed to disengage and to cause or permit reengagement of a friction clutch (not shown) in the power train of a motor vehicle. That portion of the improved apparatus 1 which is actually shown in FIG. 1 comprises a so-called central or centrally located slave cylinder and piston unit which is coaxial with an input shaft 3 extending from the stationary housing or case 4 of a change-speed transmission. The case 4 serves as a support or carrier for the tubular synthetic plastic outer wall 2 of a composite cylinder of the slave cylinder and piston unit.

Reference may be had, for example, to FIG. 1B in commonly owned U.S. Pat. No. 5,632,706 granted May 27, 1997 to Burkard Kremmling et al. for "MOTOR VEHICLE WITH ELECTRONIC CLUTCH MANAGEMENT SYSTEM". In contrast to the apparatus 1 of the present invention, the power train shown in FIG. 1B of the '706 patent employs a slave cylinder and piston unit (2) having a piston which is articulately connected with a release bearing (21) for the diaphragm spring (22) of a friction clutch (23) by a linkage (19, 20). The slave cylinder and piston unit (2) receives commands from a master cylinder and piston unit (1) by way of a conduit (3) for pressurized hydraulic fluid.

Reference may also be had to FIG. 1 of commonly owned U.S. Pat. No. 5,725,456 granted Mar. 10, 1998 to Robert Fischer et al. for "METHOD OF REGULATING THE OPERATION OF A TORQUE TRANSMISSION APPARATUS". FIG. 1 of the '456 patent shows the entire power train of a motor vehicle (1) wherein a slave cylinder and piston unit (10) receives commands from a master cylinder and piston unit (11) by way of a hydraulic conduit (9) and serves to engage and disengage a friction clutch (3) which can connect the output shaft of a combustion engine (2) with the input shaft of a change-speed transmission (4). In contrast to the apparatus 1 of the present invention, the piston of the slave cylinder and piston unit (10) in FIG. 1 of the '456 patent is not directly connected with the release bearing for the friction clutch (3), and the cylinder of the slave cylinder and piston unit (10) is not mounted on the case of the transmission (4).

Figure 3:
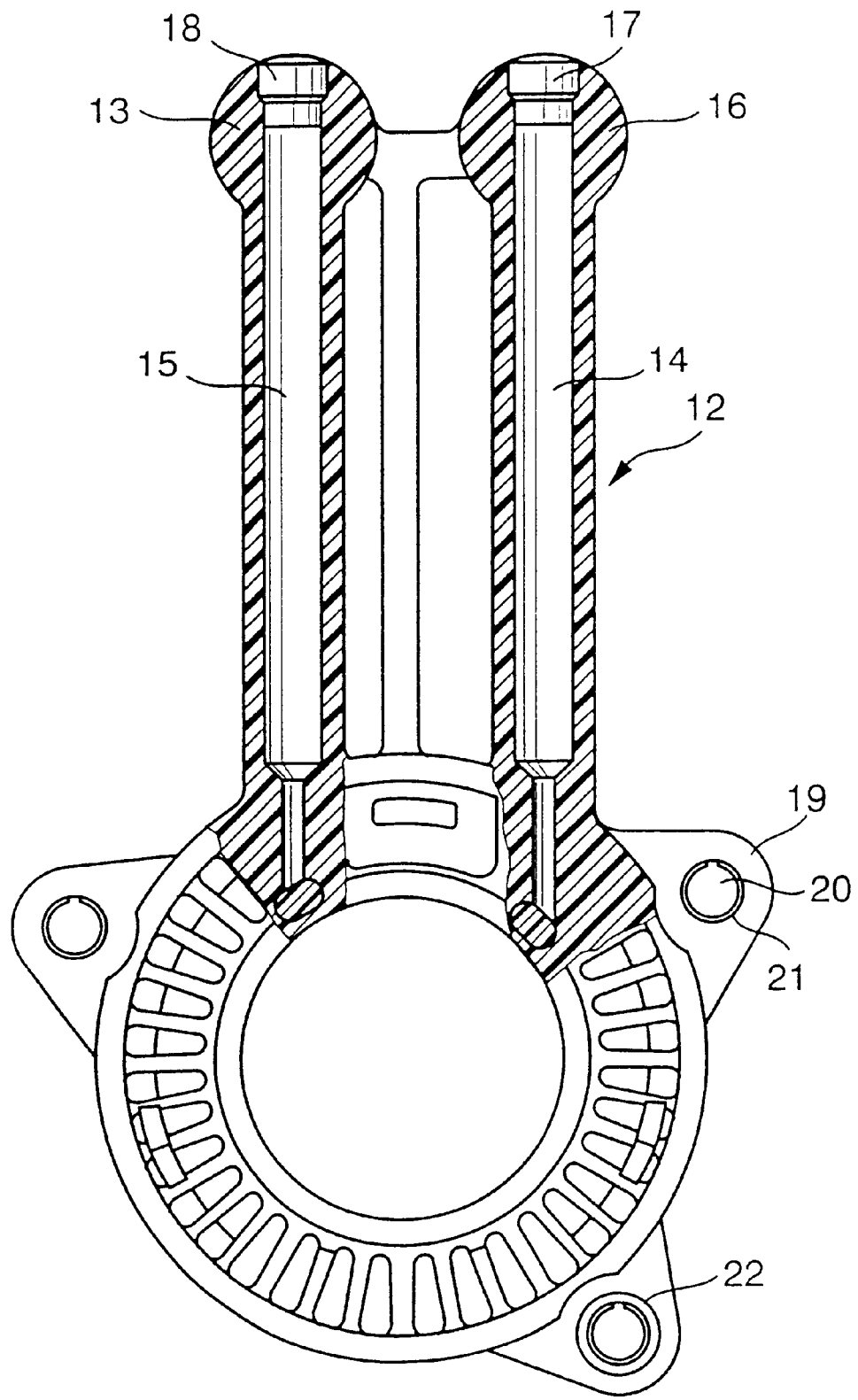
FIG. 3 is a transverse sectional view of the outer wall of the cylinder shown in FIG. 2.

Referring again to FIG. 1 of the present application, the outer wall 2 of the composite cylinder is separably secured to the transission case 4 in a manner shown in FIG. 3. The cylinder further comprises a tubular metallic inner wall 6 which is coaxial with and spacedly surrounds the input shaft 3 of the transmission including the case 4. The external surface of the inner wall 6 and the unfinished internal surface 5 of the outer wall 2 define an annular plenum chamber 8 one end of which is sealed by the reinforced annular end portion 7 of the inner wall 6 and the other end of which is sealed by the annular or ring-shaped seal 10 of a reciprocable annular piston 9. That end of the piston 9 which is remote from the plenum chamber 8 carries a release bearing 11 which can engage and displace the radially inwardly extending fingers or prongs of a diaphragm spring (not shown) forming part of a friction clutch in the power train of a motor vehicle. The manner in which a release bearing can actuate a friction clutch by tilting a diaphragm spring by way of its prongs is shown, for example, in FIG. 9 of commonly owned U.S. Pat. No. 5,632,365 granted May 27, 1997 to Paul Maucher for "FRICTION CLUTCH".

The inner wall 6 is or can be made of sheet steel in a deep drawing machine. The end portion 7 of the inner wall 6 is or can be reinforced in the deep drawing machine, e.g., by imparting thereto at least one U-shaped cross-sectional outline. The inner wall 6 can be centered relative to the input shaft 3 by extending into a complementary annular recess in the adjacent end face of the transmission case 4 which serves as a support or carrier for the composite cylinder including the walls 2 and 6.

The deformable annular or ring-shaped seal 10 of the piston 9 has an annular groove confronting the transmission case 4 and two deformable annular lips one of which is slidable along and sealingly engages the unfinished internal surface 5 of the outer wall 2 and the other of which is slidable along and sealingly engages the external surface of the inner wall 6.

In FIG. 1, the upper half of the piston 9 is shown in an axial position in which the pressure of hydraulic fluid in the plenum chamber 8 is low or the plenum chamber is empty (ventilated) so that the prongs of the diaphragm spring in the friction clutch can maintain the piston 9 in the right-hand end position in which the friction clutch is engaged. The lower half of the piston 9 of FIG. 1 is shown in the other end position in which the release bearing 11 is caused to disengage the clutch.

That end portion (28, see FIG. 4) of the outer wall 2 which is secured to the transmission case 4 is of one piece with a radially outwardly projecting extension 12 (see particularly FIG. 3). This extension defines at least one path (shown in FIG. 3 as a passage or channel 15) for the flow of pressurized hydraulic fluid from a source (see the conduit 3 shown in FIG. 1B of the '706 patent to Kremmling et al.) into the plenum chamber 8 when the release bearing 11 is to disengage the friction clutch.

That (free) end portion of the extension 12 which is remote from the outer wall 2 is provided with a nipple 13 which extends in parallelism with the axis of the outer wall 2 and can receive one end of a conduit for pressurized hydraulic fluid. Such conduit receives pressurized hydraulic fluid from a master cylinder and piston unit (not shown) which can be actuated by hand or automatically (reference should be had again to the disclosure in the '706 patent to Kremmling et al. and/or to the '456 patent to Fischer et al.). For example, the master cylinder and piston unit for the slave cylinder and piston unit including the composite cylinder 2, 6 of FIGS. 1, 2 and 3 can be actuated by a clutch pedal or in any other suitable manner.

Figure 2:
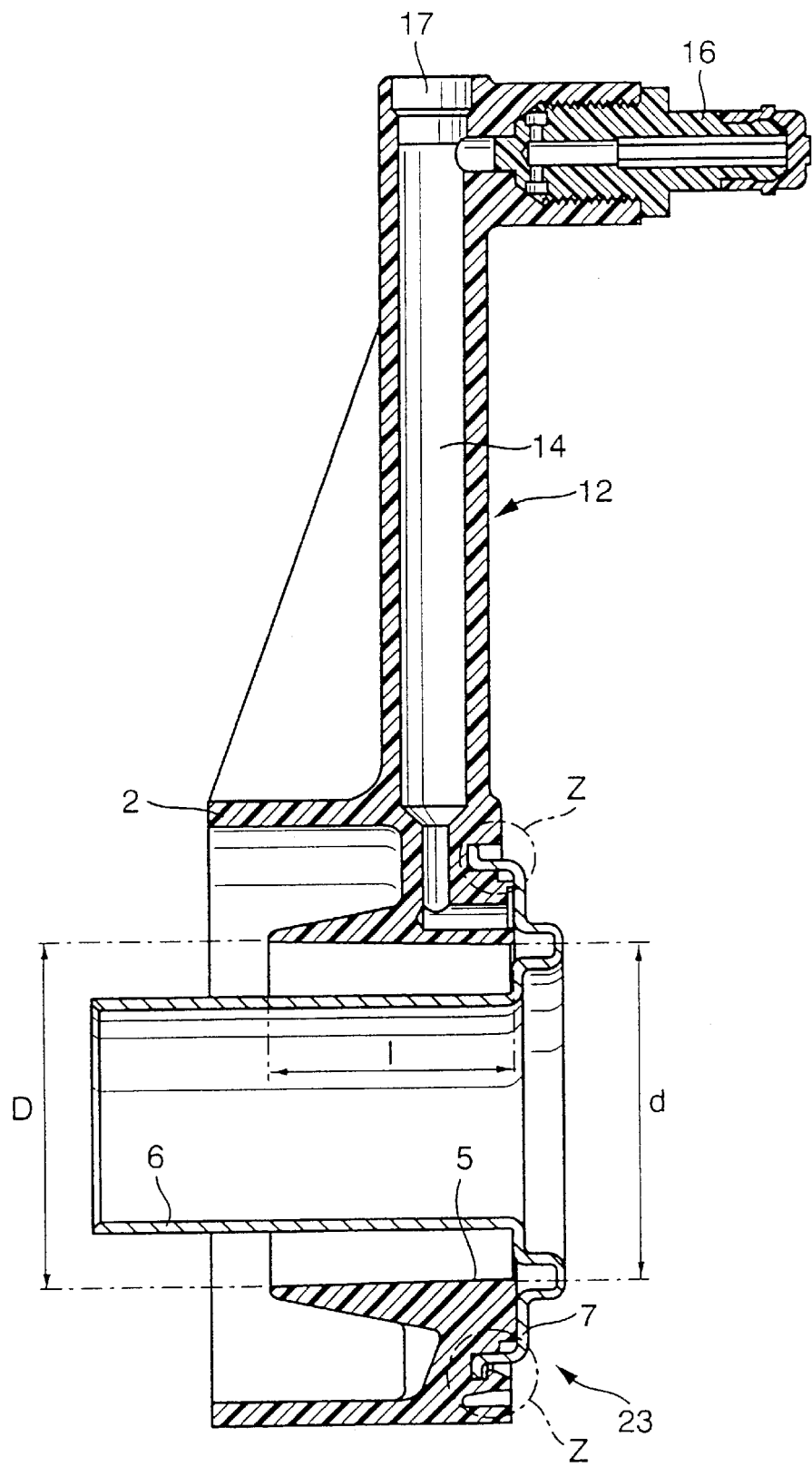
FIG. 2 is a similar axial sectional view of the composite cylinder forming part of the unit shown in FIG. 1.

The extension 12 of the outer wall 2 further defines a second passage or channel 14 which is controlled by an air flow regulating valve 16 shown in each of FIGS. 1, 2 and 3. The passages or channels 14, 15 are parallel to each other and are spaced apart from each other as seen in the axial direction of the outer wall 2. The valve 16 is installed in a radially outer portion of the extension 12 and such radially outer portion is parallel to the axis of the outer wall 2. The passage or channel 15 serves exclusively for the flow of pressurized hydraulic fluid, e.g., oil or transmission fluid.

The illustrated passages or channels 14, 15 constitute bores or holes, and their outer end portions are or can be respectively sealed by threaded or unthreaded plugs 17, 18 or in any other suitable manner. For example, the plugs 17, 18 can be sealingly secured to the adjacent portions of the radially outermost part of the extension 12 by welding and/or by resorting to a suitable adhesive; such sealing engagement can be established in addition to or in lieu of a threaded connection or a force fit.

FIG. 2 shows the composite cylinder including the walls 2 and 6 as well as the extension 12 of the outer wall. It has been found that, if the outer wall 2 is made of a suitable plastic material (preferably a thermosetting material) in an injection molding machine, the internal surface 5 of such outer wall can be properly (sealingly) engaged by the outer lip of the annular seal 10 on the piston 9 shown in FIG. 1 without any special treatment (such as finishing) of the wall 2 along the surface 5. The same holds true for the condition of the external (radially outermost) surface of the sheet metal wall 6, i.e., the inner lip of the seal 10 can properly engage such external surface to seal the respective end of the plenum chamber 9 without any treatment following the making of the wall 6 in a deep drawing machine. Such absence of the need for a special finish of the internal surface 5 and/or of the external surface of the inner wall 6 results in a pronounced reduction of the cost of making the composite cylinder including the walls 2 and 6. Furthermore, the walls 2 and 6 can be mass-produced (in large numbers per unit of time) with attendant additional savings pertaining to the cost of the composite cylinder and of the entire apparatus 1.

An important advantage of the feature that the outer wall 2 is of one piece with the extension 12 is that one reliably eliminates a potential leak spot and contributes to the strength (stiffness) of the molding including the parts 2 and 12. This is in contrast to the teaching of the aforediscussed German patent No. 43 13 346.

A standard deep drawing machine can turn out huge numbers of inner walls 6 from relatively thin-walled sheet steel stock. A composite cylinder which includes a plastic outer wall 2 and a metallic inner wall 6 can stand the anticipated deforming and/or other stresses, even if its radial dimensions are well below those of a one-piece plastic cylinder of the type disclosed in the aforementioned published German patent application A 41 29 370. Furthermore, the improved composite cylinder including a plastic outer wall 2 and a metallic inner wall 6 can guide the piston 9 and its seal 10 much more accurately and reliably than a one-piece plastic cylinder.

It was also discovered that the improved composite cylinder including the walls 2 and 6 can dissipate heat (which invariably develops in actual use of a clutch actuating apparatus) much more effectively and predictably than heretofore known apparatus. Absence of pronounced heating is particularly important for satisfactory sealing engagement of the member 10 with the adjacent surfaces of the walls 2 and 6.

The internal surface 5 of the outer wall 2 is preferably a slightly conical surface which tapers in a direction from the end portion of such surface that is remote from the transmission case 4 toward the other end portion, i.e., toward the transmission case. The difference between the respective larger and smaller diameters D and d of the internal surface 5 shown in FIG. 2 is not very pronounced but normally should not be less than 0.5°. The character 1 denotes the axial length of the conical internal surface 5.

The conicity of the internal surface 5 renders it possible to achieve a compensation for wear upon the seal 10. It is further to be borne in mind that, as the wear upon the friction linings of the clutch plate or clutch disc in a friction clutch increases, the axial position of the pressure plate of the clutch is shifted in a direction toward the clutch disc with an attendant change in the inclination or conicity of the diaphragm spring. This entails a change in the axial position of the piston 9 between the walls 2 and 6, namely in a direction toward the transmission case 4. The conicity of the internal surface 5 ensures that the sealing engagement between the lips of the seal 10 and the adjacent surfaces of the walls 2, 6 remains at least substantially unchanged because the conicity of the surface 5 can be readily selected in such a way that it compensates for wear upon the seal 10 and/or for wear upon the friction linings on the clutch disc in the friction clutch having a diaphragm spring with prongs which are arranged to be displaced by the release bearing 11.

The details of the means for separably securing the outer wall 2 to the transmission case 4 are shown in FIG. 3. That end portion (28) of the wall 2 which is of one piece with the radial extension 12 comprises several (e.g., three) radially outwardly extending circumferentially spaced-apart eyelets or grommets 19 having bores or holes 20 for the shanks of metallic or other suitable fasteners (not specifically shown) which are secured to (normally threaded into) the adjacent end portion of the transmission case 4. In order to enhance the stability of the eyelets 19 (and hence the strength of the separable connection between the outer wall 2 and the transmission case 4), the connection can further comprise slotted resilient sleeves 21 (e.g., sleeves made of steel) which are inserted into the respective bores or holes 20 in prestressed condition so that they tend to expand and thus bear against the surfaces surrounding the holes, One axial end portion of each sleeve 21 can be provided with a radially outwardly extending collar 22 (one shown in FIG. 3) which is received between one side of the respective eyelet 19 and the head of the corresponding threaded fastener (such as a bolt or a screw) while the shank of such fastener extends through the respective sleeve 21 and is anchored in the transmission case 4. The sleeves 21 prevent excessive deformation (flattening) of the eyelets 19 when the corresponding fasteners are driven home. The collars 22 can but need not be integral parts of the respective sleeves 21. The purpose of the collars 22 is to prevent pronounced deformation of relatively small portions of the plastic eyelets 19 when the fasteners (such as screws or bolts having heads bearing upon the respective collars 22) are properly anchored in the transmission case 4 or in any other suitable support.

The axial length of each sleeve 21 is preferably selected with a view to permit a certain amount of flattening of the respective eyelet 19 when the fastener is driven into the transmission case 4; this ensures a predetermined deformation of the eyelet when the attachment of the wall 2 to the transmission case 4 is completed.

Figure 4:
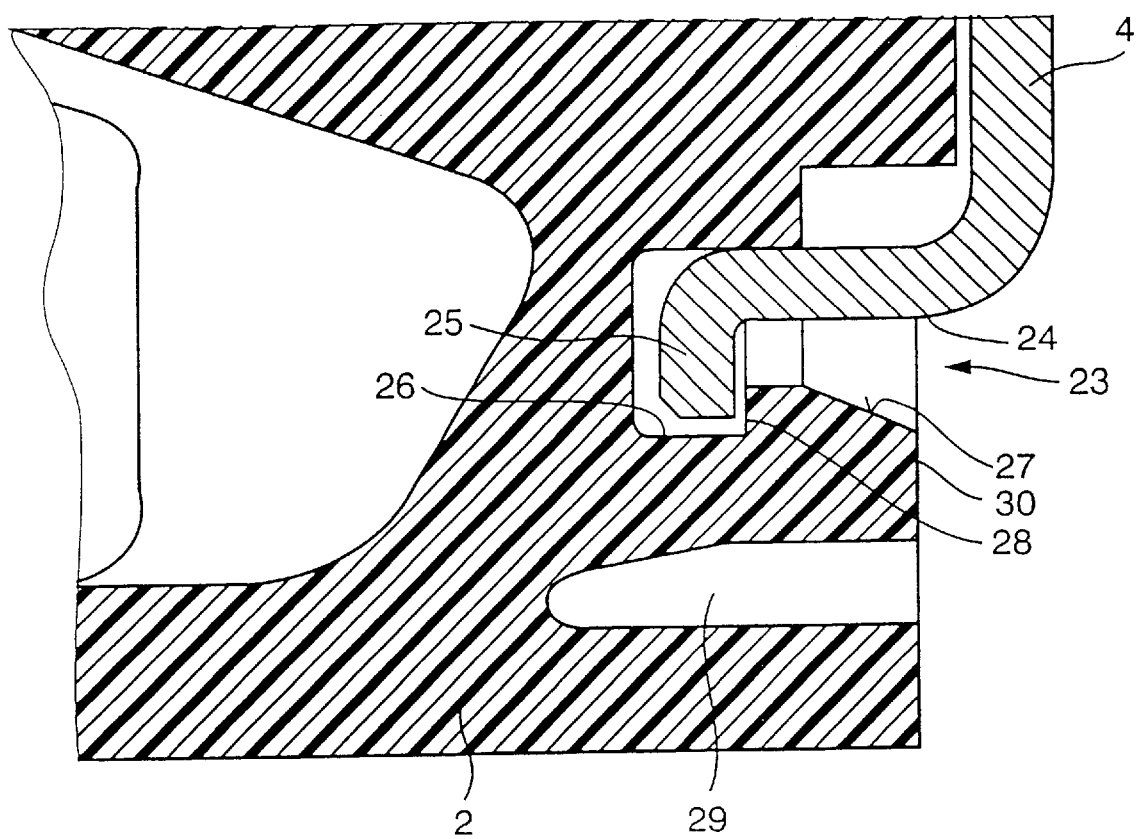
FIG. 4 is a greatly enlarged view of a detail within the circle Z shown in FIG. 2.

FIG. 4 shows the details of a presently preferred separable coupling 23 between the end portion 28 of the outer wall 2 and the reinforced end portion 7 of the inner wall 6. The coupling 23 can be said to constitute or to function as a snap fastener including a substantially or exactly annular undercut socket 26 provided in the end portion 28 of the outer wall 2 and a substantially or exactly annular male connector 24 forming part of the reinforced end portion 7 of the inner wall 6. The connector 24 is a relatively short cylinder forming the radially outermost part of the end portion 7 and having a radially outwardly extending free end 25 in the form of a flat ring which is engaged and held by a complementary ring located at the deepmost portion of the socket 26 and forming part of the end portion 28 of the outer wall 2. The character 27 denotes a slope or ramp having a frustoconical guide surface for the ring 25 of the male connector 24. The end face of the end portion 28 of the outer wall 2 is provided with an annular recess 29 which causes the end portion 28 to exhibit a short cylindrical flexible partition 30 surrounding the socket 26 and arranged to yield radially outwardly toward the recess 29 during forcible introduction of the male connector 24 and its ring 25 along the ramp 27 and into the deepmost portion of the socket 26; at such time, the partition 30 snaps back radially inwardly and the undercut part of the end portion 28 overlies the ring 25 to thus establish a desirable engagement between the end portion 7 and the end portion 28.

The circumferentially complete socket 26 can be replaced with two or more discrete arcuate sockets which are separated from each other by radially extending ribs (not shown) of the end portion 28. The circumferentially complete ring 25 is then replaced with two or more circumferentially spaced-apart arcuate sections each of which can enter a discrete arcuate socket of the end portion 28. Such modification can be resorted to if the maker of the coupling 23 desires to prevent angular movements of the walls 2 and 6 relative to each other.

The improved apparatus is susceptible of numerous additional modifications without departing from the spirit and/or scope of the present invention. For example, instead of being produced in an injection molding machine, the outer wall 2 can be mass-produced in any other suitable plastic forming machine such as a transfer molding or an injection compression machine. The same holds true for the making and shaping of the inner wall 2.

It has been ascertained that the improved composite cylinder including the plastic outer wall 2 and the metallic inner wall 6 constitutes an optimal compromise as concerns adequate stability and reasonable manufacturing cost of the cylinder and of the entire cylinder and piston unit. As already mentioned above, an injection molding technique is the presently preferred procedure for the making of the outer wall 2; the reason is that such procedure renders it possible to turn out large numbers of outer walls per unit of time because the only required reasonably precise finish or configuration is that of the internal surface 5 which comes into contact with the outer portion (shown as a lip) of the annular seal 10, and this can be readily accomplished in the injection molding machine.

The thickness of the outer wall 2 is selected with a view to ensure that the stability of such wall and of the composite cylinder will remain within an optimum range without unduly increasing the radial dimensions of the composite cylinder; such dimensions are determined primarily by the outer diameter of the release bearing 11.

The selection of a composite cylinder which employs a plastic wall and a relatively thin metallic wall exhibits the additional advantage that the unavoidable thermally induced expansion in actual use of the cylinder and piston unit does not adversely affect the operation of such unit and/or of the clutch actuating apparatus in which the composite cylinder is put to use.

The aforementioned presently preferred methods of making the outer wall 2 (i.e., in an injection molding or an analogous machine) and the inner wall 6 (i.e., in a deep drawing machine) render it possible to mass-produce a composite cylinder at a reasonable cost. This will be readily appreciated by taking into consideration that neither the internal surface 5 of the outer wall 2 nor the external surface of the inner wall 6 requires any, or any appreciable, after-treatment. Such surfaces can be sealingly engaged by the sealing device 10 of the annular piston 9. Steel sheet is one presently preferred material for the making of the inner wall 6; such material ensures accurate guidance of the sealing device 10 during the useful life of the composite cylinder, especially when compared with the quality of guidance of a piston in a cylinder which is made of a single piece of plastic material.

The snap fastener type coupling 23 of the character shown in FIG. 4 (or an equivalent form-force-locking coupling) exhibits the important advantage that the composite cylinder can be preassembled with little loss in time and in a highly reliable manner to constitute a module which is ready for storage or for shipment to an automobile assembly plant.

The aforedescribed conicity of the internal surface 5 of the outer wall 2 exhibits several important advantages. Thus, such configuration of the surface 5 renders it possible to compensate for wear upon the piston 9 (and primarily upon the seal 10) as well as for the aforediscussed wear upon the friction linings of the clutch disc in the friction clutch which is actuated by the improved apparatus 1. It has been found that the taper of the internal surface 5 of the outer wall 2 can be readily selected in such a way that the extent of sealing engagement between the seal 10 and the wall 2 (i.e., the prevention of leakage of hydraulic fluid from the plenum chamber 8) remains at least substantially unchanged during the useful life of the composite cylinder. It is further to be borne in mind that the wall 2 and/or 6 can be readily replaced with a new wall in view of the pronounced simplicity of the means (including the parts 19, 21, 22) for releasably securing the wall 2 to the transmission case 4 and also in view of pronounced simplicity of the snap fastener type coupling 23 (FIG. 4) between the walls 2 and 6.

The thermosetting material of the outer wall 2 can be selected, for example, from the group consisting of amino plastics, phenolic plastics, epoxy resins and unsaturated polyester resins. Such thermosetting material can contain selected percentages of one or more fillers and/or reinforcing (stiffening) additives. It is presently preferred to employ for the outer wall 2 a plastic material having a strength matching or approximating that of aluminum. Another advantage of an outer wall which is made of a thermosetting plastic material (as compared with other types of plastic materials) is that its heat expansion coefficient as well as its elongation at break are much more satisfactory. These are characteristics which are highly important for the useful life of the improved composite cylinder.

It has been ascertained that (at least for certain types of use of the cylinder and piston unit) it is also possible to make a composite cylinder wherein the plastic wall (corresponding to the outer wall 2 shown in the drawings of the present application) is made of a thermoplastic material, e.g., polyamide or polypropylene (such as PPA).

At the present time, the snap fastener type coupling, such as the separable form-force-locking coupling 23 shown in FIG. 4 or an equivalent or similar coupling, is intended primarily to hold the walls 2 and 6 of the composite cylinder together during storage and/or during transport from the locus of manufacture to the locale of actual use (e.g., to an automobile assembly plant). The reason is that, in a composite cylinder of the type shown in FIG. 1, the inner wall 6 is automatically and reliably maintained in an optimum position relative to the outer wall 2 because the reinforced end portion 7 is centered in the complementary recess of the transmission case 4 and the snap fastener 23 of FIG. 4 reliably couples the end portion 7 to the adjacent end portion 28 of the outer wall 2. Moreover, the piston 9, its seal 10 and the release bearing 11 cooperate with the outer wall 2 to maintain the inner wall 6 in an optimum position relative to the wall 2.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of clutch engaging and disengaging apparatus and, therefore, such adaptations should and are intended to be comprehended within the meaning and range of equivalence of the appended claims.

What is claimed is:

1. In a clutch engaging and disengaging apparatus, the combination of:

a hydraulic cylinder and piston unit including a composite cylinder having a tubular synthetic plastic outer wall, a tubular metallic inner wall spacedly surrounded by said outer wall, and means for coupling said walls to each other; and a support for at least one of said walls, wherein said means for coupling comprises a snap fastener.

2. The structure of claim 1, wherein said outer wall comprises a substantially annular first end portion and said inner wall comprises a substantially annular second end portion adjacent said first end portion, said snap fastener including means for securing said end portions to each other.

3. The structure of claim 1, wherein said outer wall has a conical internal surface spaced apart from said inner wall and having a conicity of at least 0.5°, and further comprising an annular piston reciprocably surrounded by said conical internal surface and reciprocably surrounding said inner wall.

4. The structure of claim 3, wherein said piston has a first end remote from and a second end nearer to said support, and further comprising a clutch release bearing at said first end of said piston, said internal surface tapering toward said support.

5. The structure of claim 1, wherein the plastic material of said outer wall is a thermosetting plastic.

6. The structure of claim 5, wherein said thermosetting plastic is selected from the group consisting of phenolic plastics, amino plastics, epoxy resins and unsaturated polyester resins.

7. The structure of claim 1, wherein said outer wall includes an end portion adjacent said support, and further comprising means for securing said end portion to said support, said securing means including external eyelets provided on said end portion and fasteners extending through said eyelets and engaging said support.

8. The structure of claim 7, wherein said securing means further comprises prestressed reinforcing sleeves disposed in said eyelets and tending to expand radially outwardly.

9. The structure of claim 8, wherein said fasteners are threaded fasteners each having a head at one side of the respective eyelet, each of said sleeves having a collar between said side of the respective eyelet and the head of the respective threaded fastener.

10. The structure of claim 1, wherein said outer wall and said inner wall respectively have first and second end portions and said means for coupling forms part of said end portions.

11. The structure of claim 10, wherein said second end portion includes at least one annular reinforcing section.

12. The structure of claim 10, wherein said snap fastener includes an undercut substantially annular socket provided in one of said end portions and a substantially annular male connector removably received in said socket by snap action and forming part and forming part of the other of said end portions.

13. The structure of claim 12, wherein said one end portion comprises a substantially annular ramp bounding a portion of said socket and arranged to guide said male connector into said socket.

14. The structure of claim 1, wherein said outer wall has an end portion provided with a substantially radially outwardly projecting extension of one piece with said outer wall, said extension having at least one fluid conveying passage communicating with an annular chamber between said walls.

15. The structure of claim 14, wherein said at least one passage has an end remote from said end portion of said outer wall, and further comprising means for sealing said end of said at least one passage.

16. The structure of claim 1, wherein said walls define an annular chamber and further comprising an annular piston reciprocable in said chamber between said walls, and a valve carried by said outer wall and arranged to ventilate said chamber.

17. The structure of claim 16, wherein said outer wall includes an extension defining a passage for the flow of a pressurized hydraulic fluid between a source of pressurized fluid and said chamber.

18. In a clutch engaging and disengaging apparatus, the combination of:
    a hydraulic cylinder and piston unit including a composite cylinder having a tubular synthetic plastic outer wall, a tubular metallic inner wall spacedly surrounded by said outer wall, and means for coupling said walls to each other; and
    a support for at least one of said walls, wherein said outer wall has an unfinished internal surface spaced apart from said inner wall, and further comprising an annular piston reciprocable along said internal surface around said inner wall, said piston including a seal engaging said internal surface.

19. The structure of claim 18, wherein said outer wall is a molding.

20. The structure of claim 19, wherein said molding is a product of an injection molding technique.

* * * * *